United States Patent [19]

Reeder

[11] Patent Number: 4,682,513

[45] Date of Patent: Jul. 28, 1987

[54] REPAIR KIT FOR DETENT CABLES

[76] Inventor: Leonard J. Reeder, 8055 Greenleaf Ter. - Apt. T1, Glen Burnie, Md. 21061

[21] Appl. No.: 747,575

[22] Filed: Jun. 24, 1985

[51] Int. Cl.$^4$ ............................................. F16C 1/26
[52] U.S. Cl. ................................ 206/223; 29/402.01; 285/33; 74/501 P
[58] Field of Search ...................... 29/530, 401, 401.1, 29/402.1–402.21; 74/501 D; 285/15, 16, 17, 23, 31, 33, 39; 138/97; 403/335, 338, 289; 206/223, 231

[56] References Cited

U.S. PATENT DOCUMENTS

| | | | |
|---|---|---|---|
| 1,911,659 | 5/1933 | Weaver | 285/39 X |
| 3,004,238 | 10/1961 | Damon | 74/501 D |
| 3,341,228 | 9/1967 | Miller | 285/39 X |
| 3,354,742 | 11/1967 | Tschanz et al. | 74/501 D |
| 3,572,160 | 3/1971 | Stahr | 74/501 D |
| 4,108,475 | 8/1978 | Fleischer | 285/15 |
| 4,188,836 | 2/1980 | Muller | 285/15 X |

FOREIGN PATENT DOCUMENTS

| | | | |
|---|---|---|---|
| 2615315 | 11/1977 | Fed. Rep. of Germany | 285/39 |
| 2532381 | 3/1984 | France | 74/501 D |
| 19795 | of 1894 | United Kingdom | 285/15 |

Primary Examiner—Mark Rosenbaum
Assistant Examiner—Joseph M. Gorski
Attorney, Agent, or Firm—Walter G. Finch

[57] ABSTRACT

The invention is an improved repair device for detent cables. The repair device is made up as a kit for making such a repair to a detent cable, including the necessary instructions, a special repair component, a sealant, and a replacement O-ring. The repair is made by removing a portion of the broken or damaged end of a detent cable, snapping the special repair component in place with the sealant between the special repair component and the remainder of the detent cable after the broken or damaged end has been removed, and installing the replacement O-ring.

2 Claims, 8 Drawing Figures

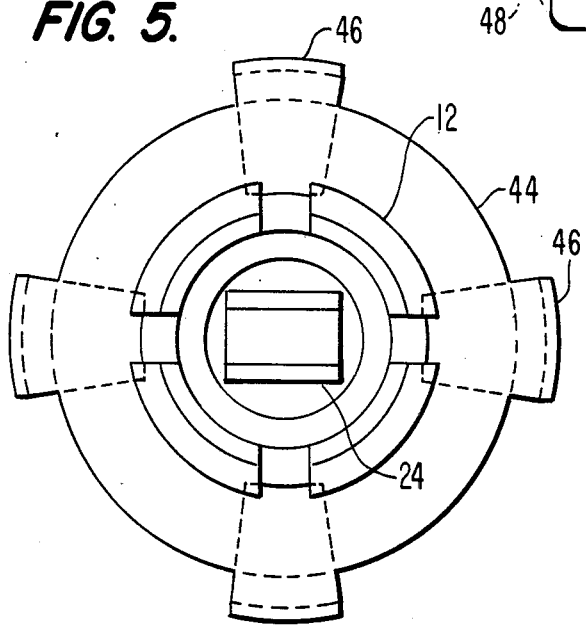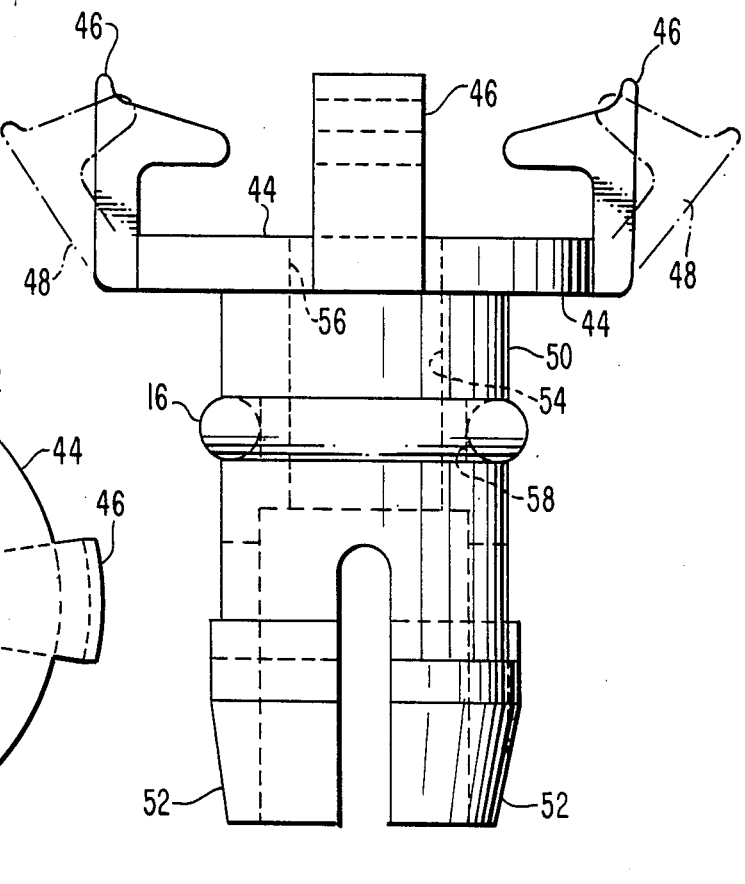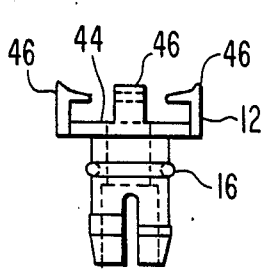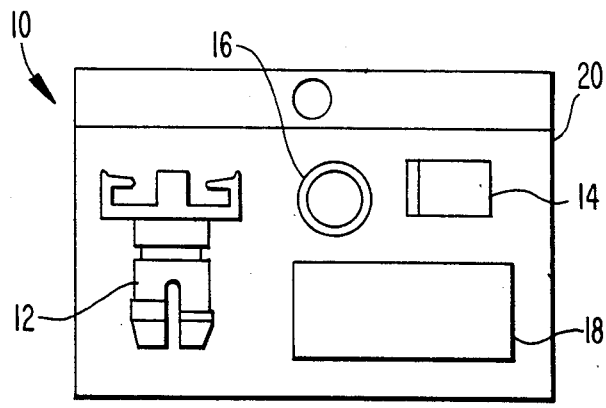

REPAIR KIT FOR DETENT CABLES

BACKGROUND AND SUMMARY OF THE INVENTION

The invention relates to automotive type equipment and in particular to detent cables located between the transmission of the automotive type of equipment and the accelerator linkage. Specifically, it relates to a method and repair device for repairing broken or damaged ends on the detent cable.

At present, when the detent cables are removed for repair of a transmission or for other associated reasons, the split ends of the detent cable usually are brittle and are damaged or broken off during the process of removal.

There is no present way to repair the broken or damaged ends and thus an entirely new detent cable is required to replace the broken or damaged component. The present invention provides a way in which the broken or damaged detent cable can now be repaired easily and economically for use in the transmission.

The end of the detent cable assembly which becomes brittle and is broken or damaged is usually made of a plastic. There are, of course, several designs of detent cables, the invention described hereinafter is for repair of detent cables having and end component substantially as shown in the drawings and as described hereinafter. As to other types of detent cables, one such other type is taught in U.S. Pat. No. 4,188,836.

As noted hereinbefore, the problem with the detent cables is that the end, which is normally made of a plastics, but could be of other suitable material, becomes brittle and when removed for repair work on the transmission, the tab-like appendages crack or break off. In the craked or broken condition there is no way of repairing the old end. As a result, a new detent cable is used to replace the detent cable with the damaged or broken end, which is a very costly process.

The present invention provides a method and a structure whereby the damaged or broken end can be removed and a substitute end used to replace it. The new substitute end is arranged for snapping it into place easily, thereby saving most of the cost of using an entire new detent cable.

The invention has been made up into a repair kit which provides the substitute snap-on detent cable end, a sealant means, a replacement O-ring, and instructions on how to remove the old damaged or broken detent cable end and how to install the new replacement substitute end on the remainder of the detent cable.

The substitute end for the detent cable has the same general configuration and characteristics of original detent cable end and has four snap-on tabs, flexibly hinged to the new substitute end used for the relacement. An optional holding band may also be used to maintain the snap-on tabs in position as the connection to the balance of the detent cable structure. The substitute end for the detent cable is made of a suitable platics material.

To install the new substitute end on a detent cable structure which has a damaged or broken end, the first step is to remove, by cutting the damaged or broken end at a preselected and predetermined point. The new substitue end is then mated with the reaminder of the original detent cable end, a sealant is applied where the new substitue end will interface with the remainder of the original detent cable end (at the cut-off face), the snap-on tabs are sanpped into place, and the relacement O-ring is affixed in position on the new substitute end. The repaired detent cable is now ready for installation in the usual manner. If an optional holding band is to be used it is placed around the snap-on tabs after they are affixed in place.

It is, therefore, an object of this invention to provide a structural component for repairing damaged or broken ends on detent cables.

It is also an object of this invention to provide a structural component, for repairing damaged or broken ends on detent cables, in kit form with the necessary instructions and other materials to effect a repair of a damaged or broken detent cable ends.

It is another object of this invention to provide a structural component for repairing damaged or broken ends on detent cables which easily snaps into place when making the repair.

Further objects and advantages of the invention will become more apparent in light of the following description of the preferred embodiments.

BRIEF DESCRIPTION OF THE DRAWINGS

FIG. 5 is a bottom view of FIG. 3;

FIG. 6 is an enlarged side view of a substitute end component for repair of a damaged or broken detent cable end;

FIG. 7 is a side view of FIG. 6 in relative actual size for normal detent cables; and FIG. 8 is a plan view of a repair kit for repairing automotive type detent cables.

DESCRIPTION OF THE PREFERRED EMBODIMENTS

Figure 1:
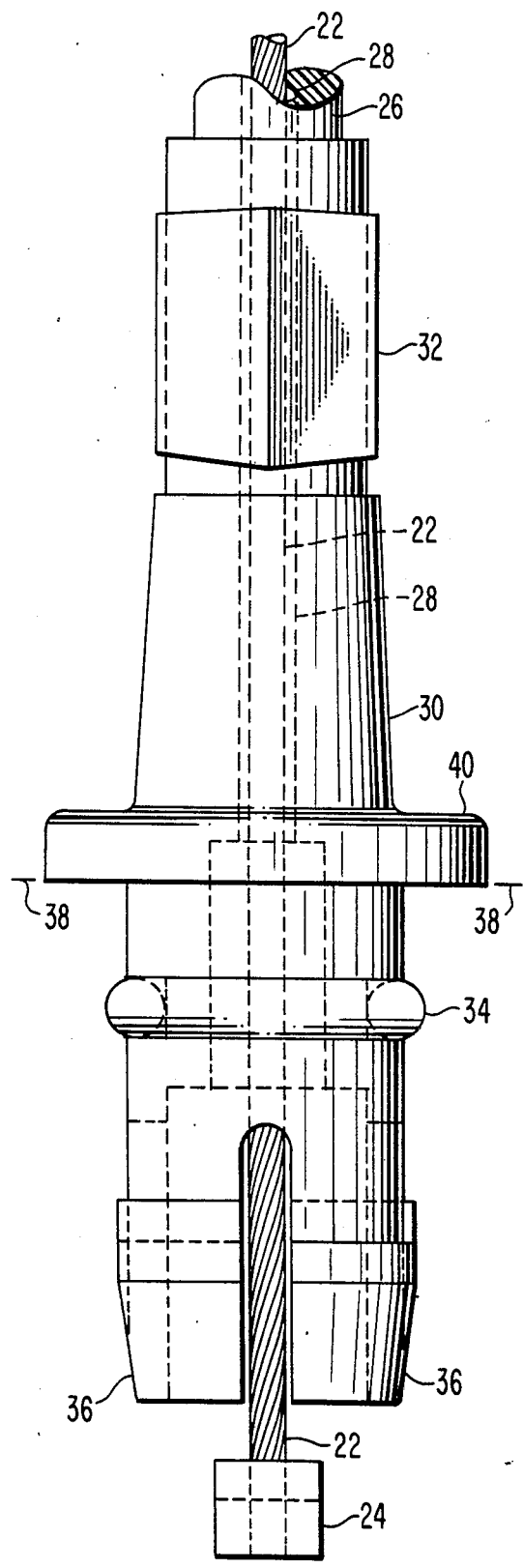
FIG. 1 is an enlarged side view of the end of an automotive type detent cable, showing the end which normally becomes damaged or broken.

Referring now to the drawings, and particularly to FIG. 8, a repair kit for detent cables is shown at 10.

The repair kit for detent cables 10 consists of: a substitute repair component 12 for repairing detent cables; a sealant means 14, such as a silicone rubber sealant; a replacement O-ring 16, such as rubber or other suitable material; a set of instructions 18 for making the cable detent repair; and a suitable packaging means 20 for packaging the components of the repair kit for detent cables 10.

Details of the elements of the sustitute repair component 12 are provided hereinafter, including the method of using it to effect the repair of a detent cable. The O-ring 16 is a relacement for the original O-ring used on the original end of the detent cable. The sealant 14 is for making a seal between the substitute repair component 12 and the prepared end of the original detent cable end as hereinafter described.

The substitute repair component 12 shown in FIG. 7 is substantially the approximate normal size of the detent cable end, however, it is to be understood that this is for illustration only and it is within the scope and intent of this invention for the substitue repair component 12 to vary in accordance with actual manufactured and marketed ends of detent cables in use. For purposes of clarity and simplification of description the enlarged views of substitute repair component 12, and the other enlarged parts of the detent cable, shown in one or more of FIGS. 1 through 6, are several times the size shown in FIG. 7.

Turning now to FIG. 1, an enlarged side view of the end of an automotive type detent cable is shown. Note that this is only a part of an entire detent cable and represents only the end of the detent cable where damaged or broken elements normally occur, as described hereinafter.

In FIG. 1, the original end of a detent cable consists of: a throttle cable 22; a cable end connector suitable affixed to the distal end of the throttle cable 22; a cable sleeve 26; a passage way 28 through the cable sleeve 26 for passage of the throttle cable 22; a complete detent cable connector end 30; a crimped-metal sleeve connector means 32; and an O-ring 34. As described hereinafter, the O-ring 34 is not reused, but a replacement O-ring 16, described hereinbefore in the repair kit for detent cables 10, is used instead.

The complete detent cable connector end 30 is the transmission housing connector means, and it is a portion of this complete detent cable connector end 30 that becomes damaged or broken and must be repaired or a complete new detent cable must be used. The portion that becomes damaged or broken is described hereinafter.

The detent cable connector end 30 has a plurality of tabs or fingers 36 at the distal end thereof. Usually there are four such tabs or fingers 36, but it is to be understood that within the scope and intent of this invention there may be more or less than four such tabs or fingers 36 on the detent cable connector end 30. It is these tabs or fingers 36 which become damaged or broken. When one or more of the tabs or fingers 36 are broken the detent cable connector end 30 must be repaired as provided by this invention or a complete new detent cable must be used.

When the detent cable connector end 30 is to be repaired the damaged or broken portion, that is, the portion containing damaged or broken tabs or fingers 36 is cut off of the detent cable connector end 30. The point at which the cut is made is preselected and predetermined and is along the line 38. The cut 38 is made just adjacent to the flange 40 of the detent cable connector end 30. In making the cut on line 38 care must be exercised so as not to cut or damage the throttle cable 22.

Figure 3:
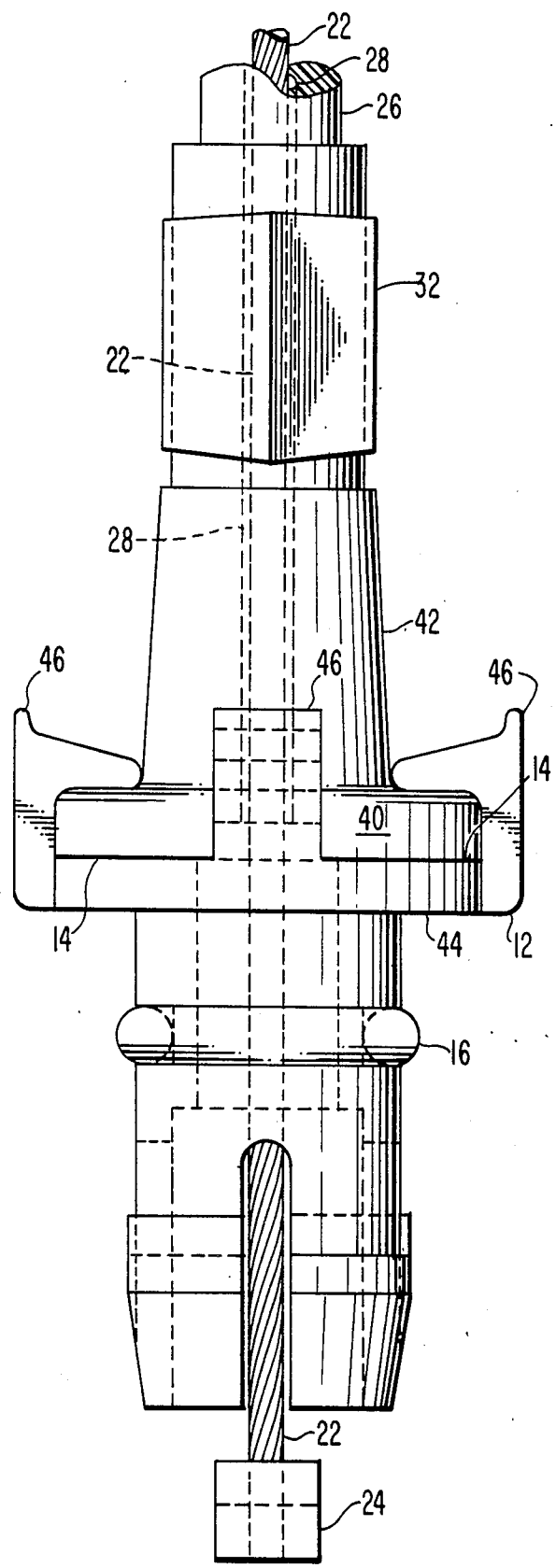
FIG. 3 is an enlarged side view of the end of an automotive type detent cable, showing a substitute end component assembled and affixed to a portion of a detent cable which is being repaired.
Figure 2:
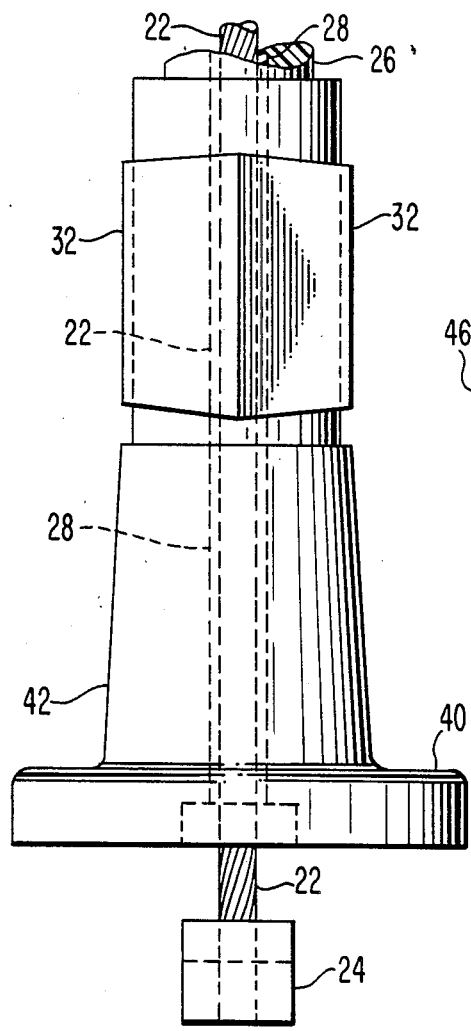
FIG. 2 is an enlarged, partially expolded, side view of the end of an automotive type detent cable, showing a substitute end component for repair of a damaged or broken detent cable end.
Figure 2:
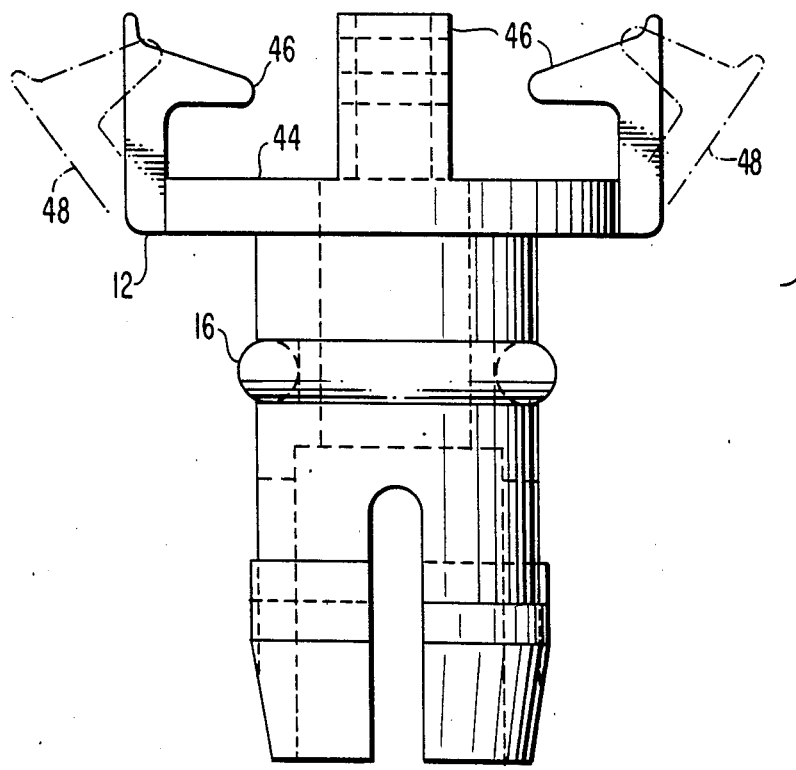

Turning now to FIGS. 2, 3, 4, 5, and 6, FIG. 2 shows and enlarged, partially exploded side view of the end of an automative type detent cable which is being repaired. As described hereinafter, the upper part is the cut off portion or remainder portion of the detent cable connector end described hereinbefore; the lower part is the repair component 12 described hereinbefore. FIG. 3 is similar to FIG. 2, except that the upper and lower parts of FIG. 2 are shown assembled and affixed to each other to effect the repair of the detent cable as will be described in detail hereinafter.

Figure 4:
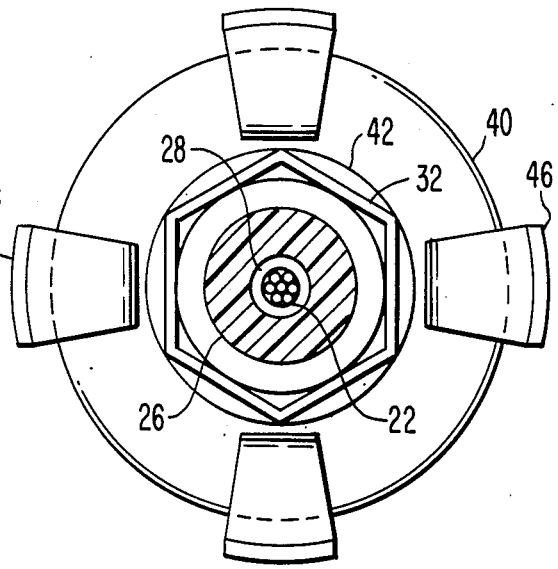
FIG. 4 is a top view of FIG. 3.

FIGS. 4 and 5 are a top view and a bottom view, respectively, of FIG. 3. FIG. 6 is an enlarged side view of the repair component 12 as shown in the lower part of FIG. 2.

Note in FIGS. 2 and 3 that the remainder portion 42 of the detent cable connector end 30, after being cut at the line 38, is the portion to which the repair component 12 is assembled and affixed.

The repair component 12 has substantially the same size and configuration in its lower portion, below the interfacing flange 44, as the original detent cable connector end 30. It is on this lower portion that the replacement O-ring 16 is removably assembled and used. The repair component 12 has a plurality of connector tabs 46 for assembly and affixing to the flange 40 of the remainder portion 42. The plurality of connector tabs 46 are spaced apart integral with, and flexibly hinged 48 to the peripheral edges of the interfacing flange 44 of the repair component 12. The interfacing flange 44 is integral with the lower portion of the repair component 12.

The lower portion of the repair component 12 which has substantially the same size and configuration as the original detent cable connector end 30 consists of main body means 50 and a plurality of finger-like tab measns 52. The main body means 50 has a passageway 54 therethrough which communicates with an aperture 56 in the interfaceing flange 44. The plurality of finger-like tabs 52 are similar in configuration to the tabs or fingers 36 of the original detent cable which become damaged or broken. A depresssed channel 58 circumferencially around the main body means 50 serves for seating the replacement O-ring 16.

The plurality of connector tabs 46 are snapped into place around the flange 40 on the remainder portion 42, as shown in FIG. 3, when the repair component 12 is affixed to the remainder portion 42. When assembling the repair component 12 to the remainder portion 42, the sealant is applied to the interfacing surfaces of the flange 40 on the remainder portion 42, and the interfacing flange 44 on the repair component 12, and then the plurality of connector tabs 46 are snapped into position as shown in FIG. 3.

A suitable securing band or wire, not shown, may be affixed around the periphery of the plurality of connector tabs 46 for added security of the connection.

The repaired detent cable is now ready for assembly in the automotive type equipment the same as a new detent cable.

As can be readily understood from the foregoing description of the invention, the present structure can be configured in different modes to provide the ability to repair a damaged or broken connector end on an automotive type detent cable.

Accordingly, modification and variations to which the invention is susceptible may be practiced without departing from the scope and intent of the appended claims.

What is claimed is:

1. A repair device for a detent cable, comprising,
a substitute detent cable end, said substitute detent cable end and having a lower portion and an upper portion, said lower portion of said detent cable end being configured substantially like the lower portion of an original detent cable end, said upper portion of said detent cable end having an interface flange means and a plurality of equally spaced connector tab means, said interface flange means, said interface flange means being formed integral with said lower portion of said substitute detent cable end and having a periphery, said plurality of connector tab means being spaced apart around the periphery of said interface flange means and being flexibly hinged to and formed integral with said interface flange means, said plurality of equally spaced, connector tab means flexibly hinged to said interface flange means being snapped into a position which rigidly affixes said substitute detent cable end to a remainder of a detent cable end that is being repaired, said interface flange means having an upper interface surface;

a replacement O-ring, said replacement O-ring being removably affixed to said lower portion of said substitute detent cable end; and a sealant means, said sealant means being suitably applied to said upper interface surface of said interface flange means wherein said lower portion of said substitute detent cable end consists of a main body means and a plurality of finger-like tab means, said plurality of finger-like tab means being formed integral with said main body means, said main body means having a passageway formed therthrough, said interface flange means having a centrally located aperture formed therein, said passageway in said main body means communicating with said aperture in said interface flange means, said main body means having a channel-like depression formed externally therearound, and said replacement O-ring being removably located in said channel-like depression.

2. A repair device for a detent cable as recited in claim 1, further including an instruction means, asid instruction means, said substitute detent cable end, said replacement O-ring, and said sealant means being suitably packaged together to form a repair kit for damaged detent cables.

* * * * *